United States Patent [19]
Cowpland

[11] 3,815,050
[45] June 4, 1974

[54] TEMPERATURE STABLE TONE GENERATOR

[75] Inventor: Michael C. J. Cowpland, Ottawa, Ontario, Canada

[73] Assignee: Microsystems International Limited, Ontario, Canada

[22] Filed: Mar. 23, 1973

[21] Appl. No.: 344,238

Related U.S. Application Data

[63] Continuation of Ser. No. 117,400, Feb. 22, 1971, abandoned.

[30] Foreign Application Priority Data

Feb. 5, 1971 Canada .............................. 104609

[52] U.S. Cl. .................. 331/110, 331/109, 331/142
[51] Int. Cl. ............................................ H03b 5/26
[58] Field of Search ..................... 331/110, 135, 142

[56] References Cited

UNITED STATES PATENTS

| | | | |
|---|---|---|---|
| 2,568,868 | 9/1951 | Pratt | 331/142 |
| 3,137,826 | 6/1964 | Boudrias | 331/182 |
| 3,460,056 | 8/1969 | Berger | 331/183 |
| 3,569,863 | 3/1971 | Cowpland et al. | 331/142 |
| 3,641,460 | 2/1972 | Holsinger | 331/110 |

OTHER PUBLICATIONS

EEE. Circuit Design Engineering, Mollinga, Pgs. 93–98, Apr. 1966

Wireless Engineer, "RC Cathode-Follower FDBK Circuits" S. C. Dunn, Jan. 1953, pgs. 10–19

EEE, M. English, pgs. 62–64, Jan. 1970

IEEE Spectrum, F. H. Hintzman, Jr. Feb. 1969 pgs. 56–60

*Primary Examiner*—John Kominski
*Attorney, Agent, or Firm*—E. E. Pascal

[57] ABSTRACT

A temperature stable tone oscillator having advantageous application as a dialing oscillator in telephone sets. An emitter-follower uses a parallel T, R-C filter with greater than unity gain in its feedback loop; a temperature stable clipper limits the signal so as to keep the emitter-follower out of saturation, while additional circuits compensate for temperature variation of the operating point of the emitter-follower, feed large amounts of current to the clipper and its reference source with a small voltage drop, etc; the tone oscillator can thus be used with very low supply voltages.

9 Claims, 5 Drawing Figures inventor MICHAEL C. J. COWPLAND
agent E.E. Pascal inventor MICHAEL C. J. COWPLAND
agent E. E. Pascal inventor MICHAEL C. J. COWPLAND
agent E. E. Pascal

TEMPERATURE STABLE TONE GENERATOR

This is a continuation of application Ser. No. 117,400, filed Feb. 22, 1971, and now abandoned.

This invention relates to an oscillator circuit which may advantageously be used to generate dialing tones in a push button telephone set.

A variety of tone generating oscillators have come into use for generating dial signalling tones in telephone sets. As the complexity of the circuitry increases, the number of circuit elements has been found similarly to increase, and it has become virtually mandatory to decrease the physical size of the oscillators. To achieve this size reduction, the use of integrated circuit or hybrid oscillators has become an objective.

One problem associated with previous oscillator circuits having this application, in which the resonant circuits are comprised of a combination of inductance and capacitance, is the variation of amplitude or frequency of the output signal with temperature. This can cause the tone received at the telephone switching office to be outside the range which allows registration of the digit associated with the tone, with the result that the operation of the dial is impaired. In addition, inductances are difficult to miniaturize, and are nearly impossible to produce in thick or thin film form or in integrated circuit form with appreciable inductance.

A problem associated with the manufacture of oscillators in hybrid form is a frequent wide variation in component values which require extreme precision. This results in decreased yield and attendant increased cost of production of the oscillators.

Approaches to the soltuion of some of the problems outlined above may be found in the articles "Twin-T Oscillators," by Fred Maynard, May 1963, Electronic's World, page 40, and "A Tone-Generating Integrated Circuit," by R. W. Berry et al, 1966. Bell Laboratories Record, page 319; and in U.S. Pat. 3,072,868, to E. R. Lucka et al, issued Jan. 8, 1963. Another approach is described in Canadian Pat. No. 857,473, to Michael C. J. Cowpland et al, issued Dec. 1, 1970.

Canadian Pat. No. 857,473 describes a low selectivity feedback network around an amplifier, where the feedback network is comprised of a twin-T filter. A relatively small amount of attenuation through the feedback network allows use of an amplifier having gain slightly more than the attenuation through the feedback network, resulting in a loop gain greater than unity, and oscillation at the frequency at which the phase shift through the feedback network is 180°.

Since the selectivity of the feedback filter network is low, it was found that the tolerance of each of the components of the feedback network did not have to be excessively narrow, and a simple variation in the shunt resistance of the filter would change the frequency of oscillation. Anodization trimming of the shunt impedance could take place while the output oscillation frequency of the entire unit was monitored, anodization stopping at the desired output frequency.

However, it was found that due to the attenuation in the feedback network, an amplifier voltage gain of, for instance, over 20 db was required in order to provide a loop gain greater than unity. With the required voltage gain and current requirements, it was difficult to operate the oscillator reliably with applied power supply voltages of less than approximately 12 volts, without incurring a large increase in output signal distortion.

It will be recognized that while an oscillator of this nature has great utility when used to generate dialing tones in a telephone set, it should also be able to be used for other purposes, and in telephone networks where the available line voltage is less than 12 volts. It has been found that while telephone central office batteries usually provide 48 volts to subscribers' lines or to trunks at the central office, after resistance and leakage losses along the lines, the voltage at the telephone set location is often as low as 5 or 6 volts. Consequently, for universal application, the tone oscillator must operate with low distortion from the low voltages. For dialing reliability the oscillation frequencies must have great precision, and the amplitude or frequency of oscillation should not vary with temperature change. Low distortion is necessary in order that harmonics would not be generated which might key other frequency registers at the telephone switching office.

I have invented a tone-generating oscillator which has high stability with temperature change, has an output distortion of less than 5%, has an almost constant output signal level with change in tone frequency, yet can operate with an applied power supply voltage (as may be received from a telephone line), of as low as 4 volts. These advantages are achieved by providing an oscillator circuit comprising an emitter follower means serially connected to a load across the means for providing operating current, a parallel T, R-C filter network which provides feedback from the load to the input of the emitter follower, and a clipping means connected to the point at which the feedback filter network is connected to the input of the emitter follower. The combined voltage gain of the filter network and the emitter follower means and load is made equal to or greater than unity at the resonant frequency of the filter network.

With the combined voltage gain very slightly over unity, the clipping means draws little current, and the distortion may be held to 3 percent, for example.

The advantage of using a parallel T filter rather than a twin-T filter in the feedback network as described in the aforementioned Canadian Pat. No. 857,473, is that a parallel T filter may be designed to have a voltage gain greater than unity with only capacitive and resistive components, resulting in the facility of being able to provide an amplifier having a voltage gain less than unity. This allows use of an amplifier having a high input impedance and a low output impedance, which loads the filter only a minimal amount. Since the voltage gain of the amplifier is less than unity, the applied power supply voltage may be very low.

Of great importance is the ability to make the feedback filter network with gain greater than unity, and also with an extremely low Q, for instance of 0.1. The filter network thus has virtually no notch and has a constant gain response with frequency, resulting in a very constant amplitude output signal, at all frequencies of interest. The clipping means acts to limit the signal amplitude entering the emitter follower means to a level lower than that which would cause saturation thereof, resulting in very low distortion.

The clipping means is designed to be extremely temperature stable, which results in virtually no change in signal amplitude with temperature change. Additional measures are taken to compensate for the change in operating point of the emitter follower means with temperature, by which the reference level from which clipping is performed changes in harmony with the emitter follower means, essentially cancelling any effects of change in its operating point.

A clipping means suitable for use as a component in this invention is described in Canadian Pat. application No. 100,304, filed Dec. 10, 1970, entitled "Voltage Clipping Circuit," by M. C. J. Cowpland.

Since the filter network has only resistive and capacitive elements, it may be manufactured using thin or thick film technology, resulting in very small size and at small expense with economical values.

The design also allows a non-precision tolerance of the components, such as ± 5 percent, while the frequency-determining element in the filter network may be trimmed to a precise frequency.

An additional feature of this invention involves means for supplying a relatively large amount of current to the amplifier from a low voltage power supply, while having the internal characteristics of a large impedance, but with a small voltage drop.

As all the components used are either transistors, diodes, capacitors, or resistors, all transistors and diodes, as well as some resistors, may be fabricated in an integrated circuit chip, while the remainder of the resistors and capacitors may be fabricated on a thin film circuit. The combination of the entire circuit in hybrid form may be encapsulated in a package measuring, for instance, 1.4 inches by 1.1 inches for inclusion in a telephone set housing.

The invention will be described in detail below, with particular reference to the accompanying drawings, in which.

Figures 3, 4:
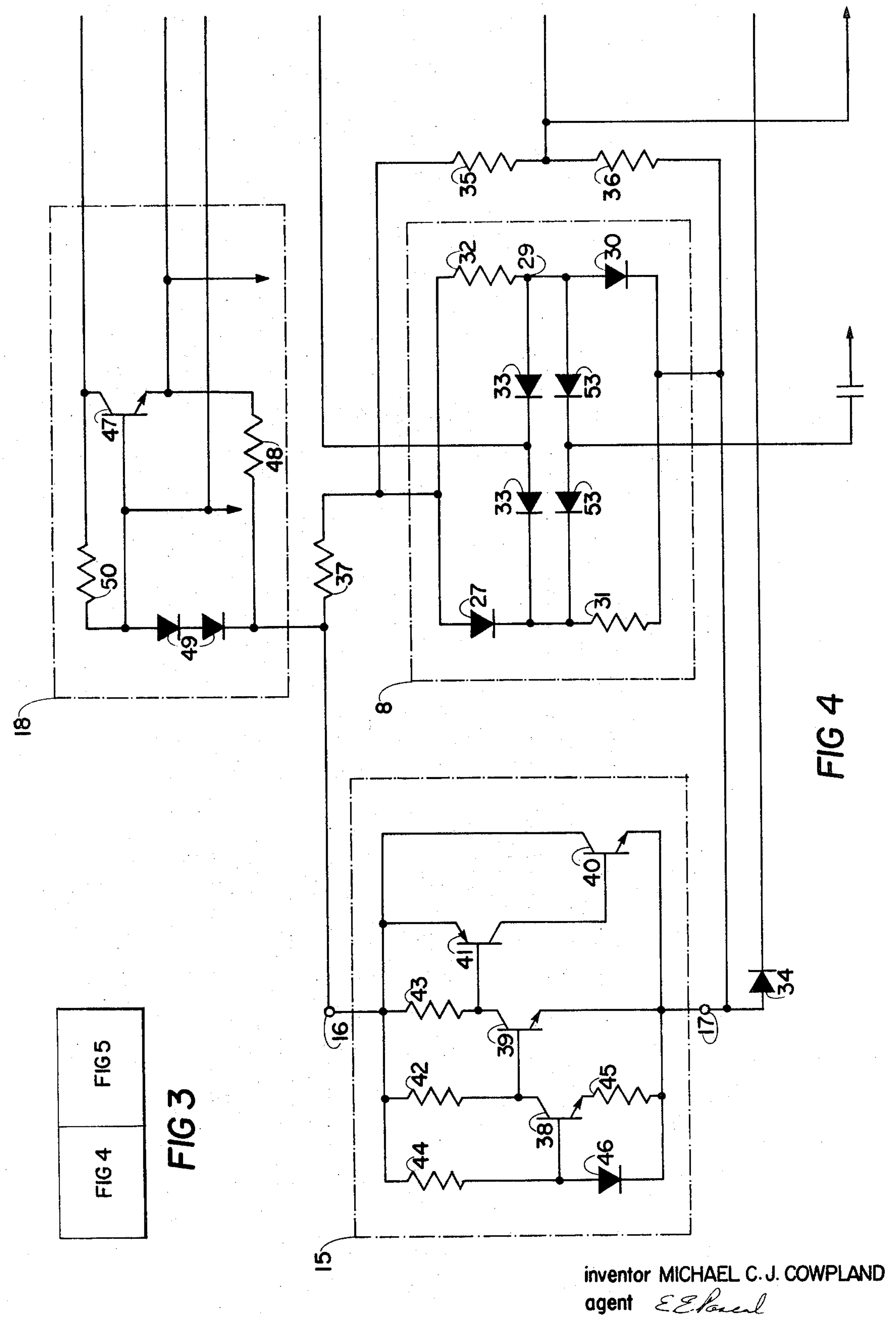
FIG. 3 is a diagram showing the assembly of FIGS. 4 and 5 together.
Figure 5:
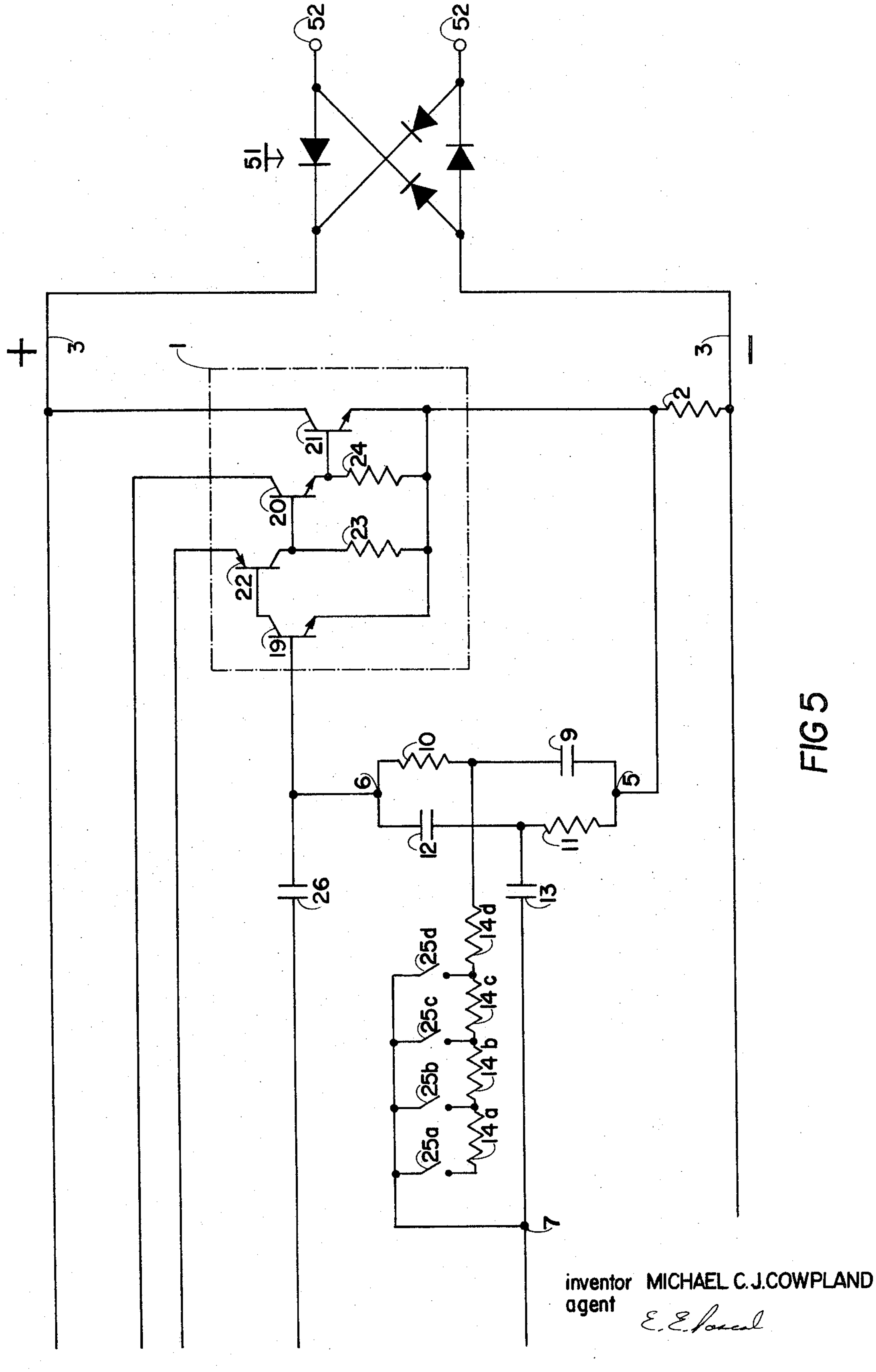

FIGS. 4 and 5 together show a detailed schematic diagram of the invention.

Figure 1:
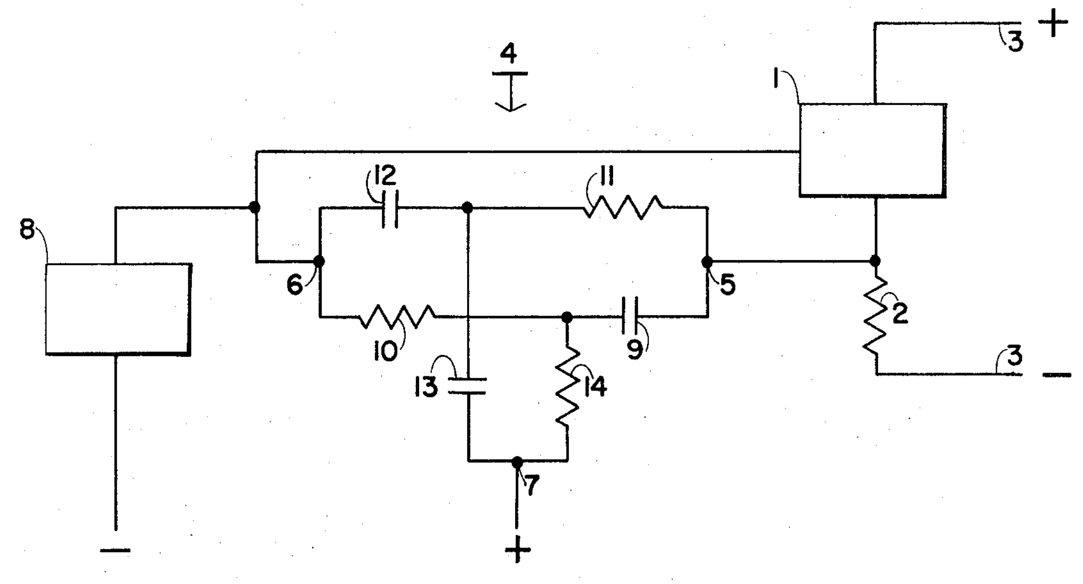
FIG. 1 is a schematic diagram partially in block form showing the invention in simple form.

Turning now to FIG. 1, an emitter follower means 1 is serially connected to a load 2, shown as a resistor, the emitter follower means and load being connected across a means for applying operating current to the circuit 3.

A parallel T, R-C filter network 4, having input terminal 5, output terminal 6, and ground terminal 7 has its input terminal 5 connected to the junction of the load 2 and emitter follower means 1. Its output terminal 6 is connected to the input of the emitter follower means 1. The ground terminal 7 is connected to an alternating current ground, which, if desired, may find its way through a source of bias voltage to one of the leads of the means for applying operating current 3.

For the purpose of controlling the amplitude of oscillation and thus reducing distortion to a minimum level, a clipping means 8 is connected to the output terminal 6 of the filter network.

It is desirable to have a loop gain, the combined voltage gain of the filter network 4 and of the emitter follower means 1, equal to or greater than unity at the resonant frequency of the filter network, but as close to unity as possible consistent with having a reasonable oscillation rise time. For instance, the voltage gain of the emitter follower means may be between 0.9 and 1.0, and the voltage gain of the filter network may be between 1.0 and 1.2, the combination always producing a combined voltage gain equal to or greater than 1.0 at the resonant frequency of the filter network.

With the loop gain greater than unity, the signal normally would continue increasing until saturation of the emitter follower means, whereupon further losses in the emitter follower means would stop further increase in signal. Since a distorted output signal would be produced, the clipping means limits the maximum amplitude of the signal entering the input of the emitter follower means to a level below which saturation thereof occurs. With the loop gain at just slightly over unity, very little clipping by the clipping means is necessary in order to keep a stable constant-amplitude oscillation at low distortion levels.

The parallel T, R-C filter network has a theoretical maximum voltage gain of 1.203, even though constructed of passive components, due to the reactance of the elements. Therefore, if the emitter follower means has a voltage gain of 993, to obtain a loop gain of unity, the filter gain should be 1.007. In order to ensure oscillation, the preferred voltage gain of the filter network is about 1.034.

The filter network comprises a first capacitor 9 serially connected to a first resistor 10 between the input terminal 5 and output terminal 6. A second resistor 11, connected to input terminal 5, is serially connected to second capacitor 12 which is further connected to output terminal 6. A third capacitor 13 is connected between the junction of the second resistor 11 and second capacitor 12 and ground terminal 7, and a third resistor 14 is connected between the junction of the first capacitor 9 and first resistor 10 and ground terminal 7.

In order that the filter network 4 should load down the load 2 as little as possible, the input impedance of the filter network should be at least 15 times the impedance of the load 2 at the resonant frequency of the filter network 4.

It is also desirable that the filter network should have an output impedance of 1 percent or less than the input impedance of the emitter follower means, in order that the emitter follower means should load the filter network down as little as possible.

In order to keep the gain of the entire circuit as constant as possible with frequency, it is preferred that the filter have an extremely low Q, for instance of 0.1 or less. Since the loop gain is greater than unity, the circuit will oscillate at the frequency at which the phase shift through the network 4 is 180°, its resonance point.

Figure 2:
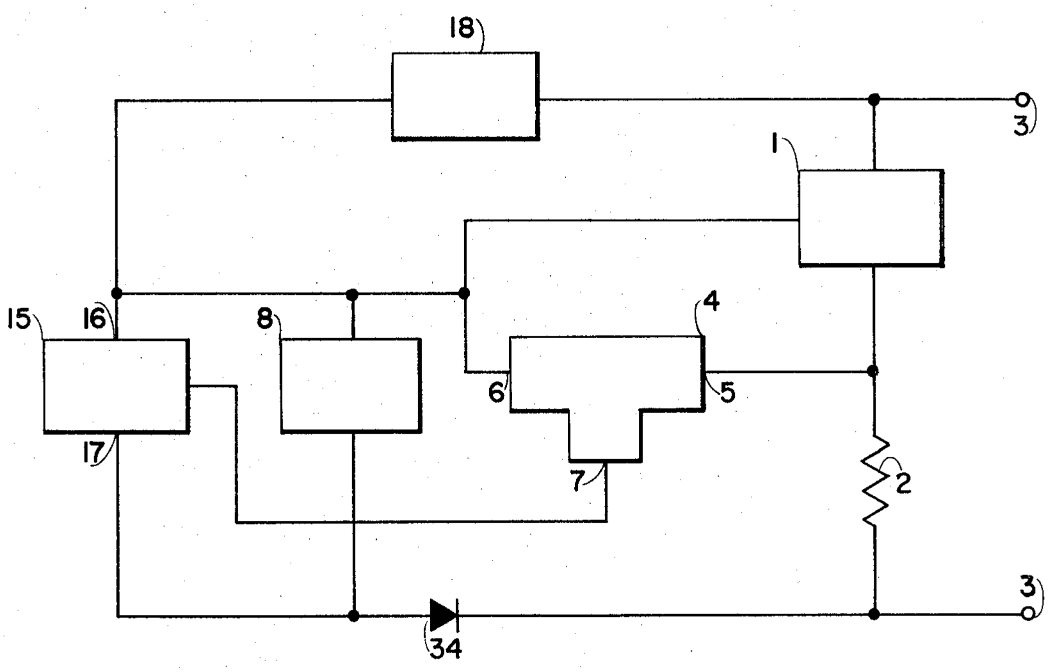
FIG. 2 is a more elaborate block schematic diagram of the invention.

Turning now to FIG. 2, a block diagram of the invention is shown more elaborately than in FIG. 1.

As in FIG. 1, emitter follower means 1 is serially connected with load 2 across the means for applying operating current 3. A parallel T, R-C network has its input terminal 5 connected to load 2 and its output terminal 6 connected to the input of emitter follower means 1. Clipping means 8 is connected to the output terminal 6 of the filter network 4.

In order to provide a stable, temperature independent reference from which the clipping means 8 may set the clipping level, and also in order to provide a stable bias voltage for the emitter follower means 1, a voltage source means 15 is provided. The voltage source means preferably has a low internal impedance, for instance of 20 ohms or less, and it provides a stable, temperature-independent voltage difference between a positive terminal 16 and a negative terminal 17, of a predetermined magnitude.

It may be seen from FIG. 1 that there is a complete conduction path through filter network 4 from the ground terminal 7 via resistors 14 and 10, to the input of emitter follower means 1. Consequently, bias potential for emitter follower 4 is preferably applied as a proportion of the voltage set by the voltage source means, through ground terminal 7 of the filter network 4 to the input of the emitter follower means 1, as shown in FIG. 2.

In order to provide a source of power for the voltage source means 15 and bias for the emitter follower means 1, a bias current means 18 is connected between the means for applying operating current 3 and the positive terminal 16 of the voltage source means 15.

It is desirable to make the internal impedance of the bias current means 18 large, for instance 5,000 ohms, to minimize power dissipation at high line voltages to which the means for applying operating current 3 could be connected during operation. A high internal impedance will also minimize any wastage of current while the oscillator curcuit draws a small amount of current during certain low current applications, and will reduce alternating current feedback from the external telephone line to alternating current ground in the circuit, as well as minimize bias changes which could be caused by line voltage variation.

However, when the current drawn by the entire circuit is, for instance, as large as 1 milliampere, an internal impedance of the bias current means of 5,000 ohms would cause a minimum voltage drop of 5 volts internally, which is unacceptably large. Consequently, bias current means 18 has been designed to have similar properties to a resistor of, for instance, 5,000 ohms, except that it can have an internal voltage drop of only about 1.2 volts, while supplying about 1.2 milliamperes.

Turning now to the detailed circuitry, FIGS. 4 and 5 should be placed together as shown in FIG. 3.

Emitter follower means 1, clipping means 8, voltage source means 15 and bias current means 18 have been surrounded by dashed line blocks in order to distinguish them more clearly.

Turning now to the emitter follower means 1, it may be seen that it is comprised of first, third, and fourth transistor means 19, 20, and 21 respectively, of one polarity type, preferably NPN, and a second transistor means 22 of a second polarity type, preferably PNP. Each transistor means has a base, an emitter, and a collector, each forming either individual transistors or components within a monolithic integrated circuit.

The emitters of the first and fourth transistor means are connected together to the load 2. The collector of first transistor means 19 is connected to the base of second transistor means 22, while the collector of the second transistor means 22 is connected to the base of third transistor means 20 which has its emitter connected to the base of fourth transistor means 21.

A first biasing resistor 23 is connected between the collector of the second transistor means 22 and the load 2, and a second biasing resistor 24 is connected between the emitter of the third transistor means 20 and the load 2. The emitter of the second transistor means 22 and the collector of the third transistor means 20 are connected to the bias current means 18.

The collector of fourth transistor means 21 is connected to the one lead of the means for applying operating current 3, which should be, with the preferred transistor means polarity types, the positive lead.

The configuration of elements shown provides a high input impedance to the emitter follower means 1, such as 10 megohms, and a voltage gain from its input to the load of about 0.993, with an output voltage swing of from 0.18 to 1.02 volts.

Transistors 19, 20, and 21 will be assumed to have a current gain of about 40 and transistor 22 of about 5. The value of the load resistance should not be lower than about 110 ohms. With these values the effective resistances of resistors 23 and 24 are high enough that they may be neglected, since they are bootstrapped into effective values outside the range of primary importance.

The amplifier structure shown greatly multiplies the transconductance of the first transistor means. The signal current in the load 2 is effectively the signal voltage appearing across the base-emitter junction of the first transistor means multiplied by the transconductance of the first transistor means 19, further multiplied by the common emitter voltage gains (betas) of the second, third, and fourth transistor means together. The product of the betas of the second, third, and fourth transistors may be considered as a predetermined multiplication factor. The resultant current gain of the emitter follower means is thus preferred to be about $10^6$.

Considering now for a moment the parallel T, R-C filter network, a detailed description has already been given with reference to FIG. 1. The reference numerals are similar to those of FIG. 1 except that third resistor 14 is shown tapped into four segments, shown respectively as 14*a*, 14*b*, 14*c*, and 14*d*. Variation in the amount of the resistance of resistor 14 causes the resonance point, where the phase shaft passes through 180°, of the filter network to change. A convenient way of varying the resistance of third resistor 14 is to connect a number of switches, shown as 25*a*, 25*b*, 25*c*, and 25*d* in series with resistor 14 portions 14*a*, 14*b*, 14*c*, and 14*d*. When any of the switches are closed, the filter network is complete, and oscillation can take place. The switches also complete the bias path through resistor 10 to the input of emitter follower means 1, initiating its operation. The switches 25*a*, 25*b*, 25*c*, and 25*d* may be external pushbutton switches, such as which may be supplied to perform the dialing function as part of a telephone set.

Thus it may be seen that the basic system is comprised of an emitter follower amplifier having less than unity voltage gain, connected to a low Q parallel T, R-C filter network which provides feedback from the output of the emitter follower amplifier to its input, the filter network having greater than unity voltage gain. With the entire loop having a gain greater than 1, it may be seen that the unit oscillates at the resonance point of the filter network. With a filter network Q being extremely small, for instance 0.1, the variation of loop gain with frequency is negligible. However, if some small gain variation may be tolerated, the Q may be less than 0.15, for example, depending on the tolerable variation.

It has been found undesirable to allow the emitter follower means to amplify the increasing feedback signal into saturation, since changes in temperature vary the transfer characteristics and operating points of the transistors, resulting in signal amplitude variation with temperature change. Consequently, the amplitude of the signal entering the emitter follower means is kept below the saturation level thereof by means of a temperature-independent clipping means 8 which is connected to the output terminal 6 of the filter network where it connects to the input of the emitter follower means. The clipping means will be described more fully later.

Useful values for the filter network, in order to obtain the required voltage gain, are as follows:

| | |
|---|---|
| 1st Capacitor 9 | 10.2 nanofarads |
| 2nd Capacitor 12 | 10.2 nanofarads |
| 3rd Capacitor 13 | 3.4 nanofarads |
| 1st Resistor 10 | 40,000 ohms |
| 2nd Resistor 11 | 8,000 ohms |
| Resistor 14*a* | 25,000 ohms |
| Resistor 14*b* | 19,000 ohms |
| Resistor 14*c* | 14,000 ohms |
| Resistor 14*d* | 42,000 ohms |

It is preferred that the clipping means 8 be coupled to the output terminal of the filter network 4 by a direct current blocking means, such as a small capacitor 26, which usefully may be 1.1 nanofarads. The load 2 may be a resistor of about 150 ohms.

As was mentioned earlier, the clipping means may be the invention described in Canadian Pat. application No. 100,034, supra, which is temperature-stable.

In essence, the clipping means 8 utilizes a temperature-stable voltage source means 15 which provides a reference voltage between positive and negative terminals 16 and 17. Means for clamping a first junction point to a predetermined voltage lower than that at the positive terminal is shown as a first clamping diode 27, having its cathode connected to first junction point 28. Means for clamping a second junction point 29 to a predetermined voltage higher than that at the negative terminal is shown as second clamping diode 30 connected between second junction point 29 and the negative terminal 17. The cathodes of both first and second clamping diodes 27 and 28 are poled toward negative terminal 17.

Completing the means for clamping the first junction point to a predetermined voltage lower than that of the positive terminal is first clamping resistor 31 which is connected between the cathode of first clamping diode 27 and negative terminal 17, and completing the means for clamping the second junction point to a predetermined voltage higher than that at the negative terminal is second clamping resistor 32 which is connected between the anode of second clamping diode 30 and the anode of first clamping diode 27.

A pair of diodes means 33 is serially and unidirectionally connected between the first and second junction point. The cathode of the pair is connected to the first junction point 28, and the anode of the pair is connected to second junction point 29.

The junction of the pair of diode means is connected, through means for blocking direct current, such as capacitor 26 to the output terminal of the filter network.

Negative terminal 17 is connected through a reference threshold-level raising diode means 34 to the load 2 where it is connected to the means for applying operating current 3. It will be noted that the emitter follower means has the equivalent of a single diode-conduction-threshold level drop between its input and the load 2, due to the base-emitter diode of first transistor means 19. In order to compensate for the drop, diode means 34 raises the reference level from which the clipping means 8 operates its clippinj level. With changes in temperature, as the base-emitter diode conduction level of transistor means 19 changes, so does the conduction level of diode means 34, changing the reference level from which clipping means 8 operates. This effectively cancels temperature effects of change in the direct current operating point of emitter follower means 1, as between its input and output.

It is preferred that the potential desired from the voltage source means 15 be adjusted so that the clipping circuit 8 keeps the amplitude of oscillation finally appearing across the load 2 at 0.84 volts peak to peak. This will be about the same voltage as at the input of the emitter follower means 1, due to the voltage gain thereof being approximately 0.99. With capacitor 26 having only a small value in order to help reduce distortion, there will be some alternating voltage drop thereacross, and consequently the voltage appearing at the junction of diode means 33 will be somewhat smaller than 0.84 volts peak to peak. The potential of the voltage source means should be adjusted at a value such that the predetermined voltages at first and second junction points 28 and 29 are approximately equal to the threshold of conduction voltages across each of the diode means 33.

Since the emitter follower means 1 has the great advantage of having only a single diode conduction threshold level drop between its input and the load, power supply voltage requirements are further minimized. As mentioned earlier, reference threshold level raising diode means 34, in the conduction path between the input of emitter follower means 1 and the opposite terminal of load 2, compensates for changes in emitter-base conduction characteristic with changes in temperature of the first transistor means 19. With changes in its temperature, the amount of leakage current traversing the emitter-base diode of transistor means 19 as well as diode means 34 are similar.

Bias for the input of emitter follower means 1, leading to the base of first transistor means 19, may advantageously be obtained through the filter network, from the voltage source means 15. A voltage divider comprising resistors 35 and 36, and voltage dropping resistor 37 are connected between positive and negative terminals 16 and 17 of the voltage source means 15. A proportion of the divided voltage is applied to the ground terminal 7 of the filter network for biasing the base of first transistor means 19. Since the resistor values within the filter network normally are considerably higher than that of resistor 36, ground terminal 7 operates effectively as alternating current ground for the filter network.

With the polarity types of the transistors and diodes shown, it will be useful to consider that the means for applying operating current 3 is comprised of one lead defining a positive junction point, shown in FIG. 4 with a + sign, and a second lead defining a negative junction point, identified with a − sign.

Turning now to the temperature-stable voltage source means 15, it is comprised of a fifth, sixth, and eighth transistor means 38, 39, and 40 respectively, of one polarity type, and a seventh transistor means 41 of a second polarity type. With the polarity conventions preferred in this embodiment, the first polarity type should be NPN, and the second polarity type should be PNP.

The collector of the fifth transistor means 38 is connected to the base of the sixth transistor means 39, the collector of the sixth transistor means 39 is connected to the base of the seventh transistor means 41, and the collector of the seventh transistor means 41 is connected to the base of the eighth transistor means 40, while the collector of the eighth transistor means 40 and the emitter of the seventh transistor means 41 are both connected to the positive terminal 16. The emitters of the sixth and eighth transistor means 39 and 40 are both connected to the negative terminal 17. Bias resistor means 42, 43, and 44 are respectively connected between the positive terminal 16 and the collector of the fifth transistor 38, the collector of the sixth transistor means 39, and the base of the fifth transistor means 38. Bias resistor means 45 is connected between the negative terminal 17 and the emitter of the fifth transistor means 38. A clamping diode means 46 is connected between the base of the fifth transistor means 38 and the negative terminal 17, with its polarity in the same sense as the baseemitter junction diode of the fifth transistor means.

The voltage source means 15 can thus provide a temperature-stable voltage of about 1.3 volts, with a low dynamic impedance between positive and negative terminals 16 and 17, of about 20 ohms, allowing it to function as close to an ideal constant voltage source as possible.

It is expected that this invention will be used connected to telephone lines, where line voltages from about 35 volts down to about 6 volts may be expected. Therefore, in order that this wide variation of voltages may be efficiently used to power the circuit, bias current means 18 which supplies current to the voltage source means should be of relatively high effective internal impedance, for instance of the order of 5,000 ohms, as mentioned earlier.

Since the current required by the described circuit can be approximately 1 milliampere, a 5,000 ohm internal resistance would have a voltage drop of 5 volts across it, which obviously is undesirably high considering the low line voltages which are expected to power this circuit. Therefore, applicant has invented a bias current means which has the same regulatory properties as it would, should it have an internal impedance of about 5,000 ohms, but will operate with an internal voltage drop of about 1.2 volts, while supplying 1.2 milliamperes.

The bias current means 18 is connected between the means for applying operating current and the positive terminal 16 of the voltage source means. With the component types shown, it should be connected to the positive lead of the means for supplying operating current. Bias connections are also made from the bias current means to the emitter of the second transistor means 22 and to the collector of the third transistor means 20.

The bias current means 18 is comprised of a supply transistor means 47, of NPN type in this embodiment, having a base, an emitter, and a collector. The collector is connected to the positive lead of the means for applying operating current.

The emitter is connected through an emitter load resistor 48 to positive terminal 16. The base of the supply transistor means is clamped to a predetermined voltage higher than positive terminal 16, in order to bias the supply transistor to a predetermined point. In this embodiment, a pair of serially and unidirectionally connected diodes 49 is connected between the base and the positive terminal 16 as shown. One of the pair of the diodes compensates for the base-emitter voltage drop in supply transistor 47, while the other sets up the bias to the voltage level equal to one diode threshold level of conduction. Resistor means 50 provides bias current for supply transistor 47 as well as operating current for the pair of diodes 49.

Particular care was utilized in the design of this invention in order to enable operation of a second oscillator circuit, keyed simultaneously with the one already described. The second oscillator provides a second precise tone; the combination of the first and second tones being recognized by a distant telephone office as representative of a certain dialed digit.

The second oscillator circuit is comprised of a second emitter follower means serially connected to a second load and a second parallel T, R-C filter coupling the output of the emitter follower means to its input. The same clipping means as used for the first oscillator is connected to the output of the filter means in order to limit the signal entering the second emitter follower means from driving it into saturation.

The second oscillator circuit (not shown in the drawings) is constructed identical to the first, with the exception of the capacitors in the filter network. The capacitance of the equivalent capacitor to first capacitor 9 is preferred to be about 5.7 nanofarads, the equivalent of the second capacitor 12 to be 5.7 nanofards, the equivalent of third capacitor 13 to be 1.9 nanogards, and the equivalent of third capacitor 13 to be 1.9 nanofarads, and the equivalent of capacitor 26 to be 0.62 nanofarads.

The ground terminal of the filter of the second oscillator should be connected directly to the ground terminal 7 of filter network 4, and the bias leads be connected to the equivalent of second and third transistor means 20 and 22 should be connected directly to the emitter and base of supply transistor means 47. The bias leads and ground lead just described to be connected to the second oscillator circuit are shown as arrow heads in FIGS. 4 and 5.

In order to provide a second facility for clipping at precisely the same level as for the first oscillator, a second pair of diode means 53, identical to diode means 33, is serially and unidirectionally connected in parallel to diode means 33 across junction points 28 and 29, in the same polarity sense. The junction of diode means 53 may then be connected through a means for blocking direct current, for instance through a capacitor equivalent to capacitor 26, to the output terminal of the second filter network.

Since the second emitter follower means will have a transistor means equivalent to transistor 21, and a load equivalent to load 2, the leads of the transistor means and load not connected together should be connected in parallel with those of transistor 21 and load 2, to the leads of the means for applying operating current 3.

In order to key the second oscillator on at the same time as the first oscillator, the individual switches 25 should be closed together with the corresponding individual switches of the second oscillator.

Where the integrated circuit or film designs cause stray capacitance to occur, it may be necessary to change the phase angle of the load 2, or of the telephone line, using well-known techniques, in order to stop any possible parasitic oscillations.

In order to allow the circuits to operate at the lowest voltage, a capacitor of large capacitance, for instance of 1 microfarad may be connected from the base of supply transistor 47 to the cathode of diode means 34.

The circuit described has the ability of keeping gain variation as small as ± 0.2 percent for frequencies of 900 to 1,600 hertz. With the large value resistance of third resistor **14*d*, mixing of frequencies of the two oscillators connected to ground terminal 7 is minimized. A filter gain of about 1.034 coupled with an amplifier gain of about 0.99 provides excess loop gain over 1** for reliable oscillation and fast rise time, but is not so large that unnecessary distortion is produced by the clipping process. As was mentioned earlier, harmonic distortion may be found to be well under 5 percent, for instance at 3 percent.

It is expected, of course, that if this invention is used connected to a telephone line, the leads forming the means for applying operating current should be able to be connected to the telephone line with complete disregard of the polarity of the potential appearing thereon. For that reason, a well-known diode bridge 51 may be connected between the means for applying operating current 3 and a pair of output terminals 52 which are to be connected to the line. The diode bridge performs the function of converting either encounterd polarity to positive and negative potential applied to the means 3 according to the signs shown.

An oscillator circuit has been described which provides extreme stability in frequency and amplitude of oscillation particularly with changes in ambient temperature and externally applied voltage, which has low distortion, and which can operate from low power supply voltages. A great advantage is the ability to manufacture this invention with relatively wide tolerance values, for instance 5 percent in the case of the passive components, trimming resistor 14 to a precise value dependent on output frequency, while still maintaining the aforementioned high stability.

While transistor means, capacitor means, resistor means, and diode means have been described as the principal components of this invention, the specific terminology used was intended to convey the desirability of manufacturing the aforementioned components not as individual discrete units, but as elements functioning as transistors, resistors, capacitors, and diodes in integrated circuits, thin film circuits, and thick film circuits. In fact, the entire invention has been fabricated and mounted in a package measuring 1.376 inches by 1.100 inches by 0.230 inches, including a resistor module, a capacitor module, and either 1, or 2, integrated circuit chips.

Many modifications, new embodiments, and variations of the invention may be now conceived by one skilled in the art understanding the invention, which will fall within the ambit of the claims. For instance, third resistor 14 may be made in potentiometer form, or as one or more voltage dependent resistors or thermistors. These variations may usefully be applied to telemetry applications, remote controlling, electronic switching, etc. Automatic regulation of the line voltage may be obtained using a shunt varistor connected across output terminals 52, in order to compensate for different lengths of line. Other apparatus such as zener diodes, etc, may be also used for voltage limiting, protection, etc. Also, additional resistors may be added into the series of resistors **14*a*, 14*b*, 14*c*, and 14*d*** to provide additional tones.

What is claimed is:

1. An oscillator circuit comprising:

a. means for applying operating current to said circuit, b. an emitter follower means having a voltage gain less than unity, and a load, serially connected across the (a) means, c. a parallel T, R-C filter network, having an input terminal, an output terminal, and a ground terminal, the input terminal being connected to the junction of the load and the emitter follower means, and the output terminal being connected to the input of the emitter follower means, said network having a voltage gain greater than 1.0 and less than 1.2, the combined voltage gain of said filter network and the emitter follower means and load being equal to or greater than unity at the resonant frequency of said filter network, the filter network having an input impedance not less than about 15 times the impedance of the load, and an output impedance 1 percent or less than the input impedance of the emitter follower means, d. means for connecting the ground terminal to alternating current ground, and e. clipping means connected to the output terminal of said filter network, having a conduction threshold of such level as to limit the amplitude of a signal at the filter output terminal to a level lower than that which would drive the emitter follower into saturation, comprising a voltage source means for supplying a stable voltage difference between a positive terminal and a negative terminal; means for clamping a first junction point to a predetermined voltage lower than that at the positive terminal; means for clamping a second junction point to a predetermined voltage higher than that at the negative terminal; a pair of diode means serially and unidirectionally connected between the first and second junction points, the cathode and anode of the pair being connected to the first and second junction points respectively; the predetermined voltages each being about equal to the thresholds of conduction voltages across each of the diode means; the junction of the pair of diode means being connected, through means for blocking direct current, to the output terminal of said filter network; and a reference threshold-level-raising diode means connected between the (a) means and the negative terminal in the same polarity sense as the base-emitter junction diode of the emitter follower means, both said latter diode and the reference threshold-level-raising diode means having similar thresholds of conduction.

2. A circuit as defined in claim 1, further comprising a voltage divider connected between the positive and negative terminal, having an output voltage tap, the output voltage tap being connected to the ground terminal of said filter network, the voltage at said tap being of predetermined value such as to bias the emitter follower means to a value intermediate its off and saturation levels.

3. A circuit as defined in claim 2, in which the (a) means is comprised of a positive junction point and a negative junction point, further including bias current supply means comprising a supply transistor means having a base, an emitter, and a collector, the collector being connected to the positive junction point, the emitter being connected through an emitter load resistor to said positive terminal; and a pair of serially and unidirectionally connected diodes connected between said base and said positive terminal, said pair of diodes being poled in the same sense as the base-emitter diode junction of the supply transistor means; the emitter follower means comprising first, third and fourth transistor means of one polarity type, and a second transistor means of a second polarity type, each having a base, an emitter, and a collector; the emitters of the first and fourth transistor means being connected together to the load, the collector of the first transistor means to the base of the second transistor means, the collector of the second transistor means to the base of the third transistor means, and the emitter of the third transistor means to the base of the fourth transistor means; a first biasing resistor connected between the collector of the second transistor means and the load, and the second biasing resistor connected between the emitter of the third transistor means and the load; the emitter of the second transistor means being connected to the base of the supply transistor means, and the collector of the third transistor means being connected to the emitter of the supply transistor means; the collector of the fourth transistor means being connected to said positive junction point, and the load terminal which is not connected to the fourth transistor means being connected to said negative junction point; the first, third, fourth, fifth, sixth, eighth, and supply transistors being of NPN polarity type, and the second and seventh transistor means being of PNP polarity type; the voltage gain of the filter network being 1.03 ± 2 percent, and having a Q of less than 0.15; the amplifier having a current gain of about $10^6$; said filter network having an input impedance of about 15 times the impedance of the load, and an output impedance 1 percent or less than the input impedance of the emitter follower means.

4. An oscillator circuit comprising:

a. means for applying operating current to said circuit, b. an emitter follower means having a voltage gain less than unity, and a load, serially connected across the (a) means, c. a parallel T, R-C filter network, having an input terminal, an output terminal, and a ground terminal, the input terminal being connected to the junction of the load and the emitter follower means, and the output terminal being connected to the input of the emitter follower means, said network having a voltage gain greater than 1.0 and less than 1.2 and a Q of less than 0.15, the combined voltage gain of said filter network and the emitter follower means and load being equal to or greater than unity at the resonant frequency of said filter network, the filter network having an input impedance not less than about 15 times the impedance of the load, and an output impedance 1 percent or less than the input impedance of the emitter follower means, d. means for connecting the ground terminal to alternating current ground, e. clipping means connected to the output terminal of said filter network, having a conduction threshold of such level as to limit the amplitude of a signal at the filter output terminal to a level lower than that which would drive the emitter follower into saturation, and f. means for providing X milliamperes of bias current to the oscillator, connected between one of the pair of input terminals and the oscillator, having an effective internal impedance of Y ohms, and an internal voltage drop of less than ⅓ xy.

5. A circuit as defined in claim 4, further including means connected between the clipping means and said oscillator for varying the threshold of clipping level similarly as the change of conduction threshold level of said oscillator circuit with change of temperature.

6. An oscillator circuit comprising:

a. means for applying operating current to said circuit, b. an emitter follower means having a voltage gain less than unity, and a load, serially connected across the (a) means, c. a parallel T, R-C filter network, having an input terminal, an output terminal, and a ground terminal, the input terminal being connected to the junction of the load and the emitter follower means, and the output terminal being connected to the input of the emitter follower means, said network having a voltage gain greater than 1.0 and less than 1.2, the combined voltage gain of said filter network and the emitter follower means and load being equal to or greater than unity at the resonant frequency of said filter network, having an input impedance not less than about 15 times the impedance of the load, and an output impedance 1 percent or less than the input impedance of the emitter follower means, d. means for connecting the ground terminal to alternating current ground, e. clipping means connected to the output terminal of said filter network, having a conduction threshold of such level as to limit the amplitude of a signal at the filter output terminal to a level lower than that which would drive the emitter follower into saturation, f. means for providing X milliamperes of bias current to the oscillator, connected between one of a pair of input terminals and the oscillator, having an effective internal impedance of Y ohms, and an internal voltage drop of less than ⅓ xy, g. means connected between the clipping means and the emitter follower means for varying the threshold of the clipping level similarly as the change of conduction threshold level of the emitter follower means with change of temperature, and h. a constant voltage reference connected to the clipping means comprising a current input terminal; the means for providing bias current comprising a supply transistor having a base, and an emitter, and a collector, the collector being connected to one of the input terminals, an emitter load connecting the emitter to the current input terminal of the constant voltage reference, a pair of serially and unidirectionally connected diodes connected between the input terminal and the base, and a current supply resistor connected between the base and the collector.

7. A circuit as defined in claim 2, further including:

i. a second emitter follower means similar to the first-defined emitter follower means, and a second load, similar to the first-defined load, serially connected across the (a) means;

ii. a second parallel T, R-C filter network with the resonance point different from the resonance point of the first-defined filter network, having an input terminal, an output terminal, and a ground terminal, the input terminal being connected to the junction of the second load and the second emitter follower means, the output terminal being connected to the input of the second emitter follower means, and the ground terminal being connected to said tap; and iii. a second pair of diode means similar to the first-defined pair of diode means serially and unidirectionally connected between said first and second junction points in the same conduction sense as the first-defined pair of diode means;

iv. the junction of the second pair of diode means being connected, through a second means for blocking direct current, to the output terminal of said filter network;

v. the combined voltage gain of said second filter network and the second emitter follower means and second load being equal to the combined voltage gain of said first-defined filter network and emitter follower means and load at the resonant frequency of said second filter network.

8. An oscillator circuit comprising:

a. means for applying operating current to said circuit, b. an emitter follower having a voltage gain of about 0.99, and a load, serially connected across the (a) means, c. a parallel T, R-C filter network, having an input terminal, an output terminal, and a ground terminal, the input terminal being connected to the junction of the load and the emitter follower means, and the output terminal being connected to the input of the emitter follower means, said network having a voltage gain of 1.03 ± 2 percent and a Q of less than 0.15, the combined voltage gain of said filter network and the emitter follower means and load being equal to or greater than unity at the resonant frequency of said filter network, the filter network having an input impedance not less than about 15 times the impedance of the load, and an output impedance 1 percent or less than the input impedance of the emitter follower means, d. means for connecting the ground terminal to alternating current ground, e. said network comprising a first capacitor connected to the input terminal and a first resistor connected between the first capacitor and the output terminal; a second resistor connected to the input terminal and a second capacitor connected between the second resistor and the output terminal; and a third capacitor connected between the junction of the second resistor and the second capacitor, and the ground terminal; and a third resistor connected between the junction of the first capacitor and first resistor, and the ground terminal, f. means for varying the resistance of the third resistor of said filter network such that the resonant and oscillation frequency thereof may be changed, and g. clipping means connected to the output terminal of said filter network, having a conduction threshold of such level as to limit the amplitude of a signal at the filter output terminal to a level lower than that which would drive the emitter follower into saturation.

9. A circuit as defined in claim 1, further comprising a diode bridge connected to said (a) means, having a pair of input terminals for connection to a telephone line having a current supply of any polarity, and a pair of output terminals connected so as to supply positive line current to the terminal of the (a) means connected to the emitter follower means, and negative line current to the terminal of the (a) means connected to the load.

* * * * *